US012586361B2

(12) United States Patent　　　　(10) Patent No.:　US 12,586,361 B2
Azarian Yazdi et al.　　　　　　　　(45) Date of Patent:　　Mar. 24, 2026

(54) ONLINE ADAPTATION OF SEGMENTATION MACHINE LEARNING SYSTEMS

(71) Applicant: QUALCOMM Incorporated, San Diego, CA (US)

(72) Inventors: Kambiz Azarian Yazdi, San Diego, CA (US); Debasmit Das, San Diego, CA (US); Hyojin Park, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/364,728

(22) Filed: Aug. 3, 2023

(65) Prior Publication Data

US 2024/0078797 A1　　Mar. 7, 2024

Related U.S. Application Data

(60) Provisional application No. 63/401,611, filed on Aug. 27, 2022.

(51) Int. Cl.
　　G06V 10/778　　　(2022.01)
　　G06N 3/0895　　　(2023.01)
　　　　　　(Continued)

(52) U.S. Cl.
　　CPC ......... G06V 10/778 (2022.01); G06N 3/0895 (2023.01); G06V 10/267 (2022.01); G06V 10/82 (2022.01)

(58) Field of Classification Search
　　CPC .......... A61P 43/00; A61P 9/00; C12Q 1/6883; C12Q 2600/118; C12Q 2600/136;
　　　　　　(Continued)

(56) References Cited

U.S. PATENT DOCUMENTS 11,410,315 B2　　8/2022　Homayounfar et al.
11,449,788 B2 *　9/2022　Perona ..................... G06F 16/48
　　　　　　(Continued)

FOREIGN PATENT DOCUMENTS

CN　　　110503097 A　　11/2019
EP　　　　4091093 B1 *　4/2025　............... G06N 3/09
　　　　　　(Continued)

OTHER PUBLICATIONS

Liangzhi Li et al. , "Article Self-Supervised Keypoint Detection and Cross-Fusion Matching Networks for Multimodal Remote Sensing Image Registration," Jul. 27, 2022,Remote Sens. 2022, 14, 3599,pp. 1-14.*
Tahir Rizwan et al. , "Neural Network Approach for 2-Dimension Person Pose Estimation With Encoded Mask and Keypoint Detection," Jun. 10, 2020, IEEEAcess,vol. 8, pp. 1-10.*
　　　　　　(Continued)

*Primary Examiner* — Omar S Ismail
(74) *Attorney, Agent, or Firm* — Polsinelli LLP

(57)　　　　　ABSTRACT

Techniques and systems are provided for performing online adaptation of machine learning model(s). For example, a process may include obtaining features extracted from a image by a machine learning model during inference and determining, by the machine learning model based on the features during inference, a plurality of keypoint estimates in the image and/or a bounding region estimate associated with an object in the image. The process may further include generating pseudo-label(s) based on the plurality of keypoint estimates and/or the bounding region estimate. The process may include determining at least one self-supervised loss based on the plurality of keypoint estimates and/or the bounding region estimate. The process may further include adapting, based on the at least one self-supervised loss, parameter(s) of the machine learning model. The process may include generating, using the machine learning model with the adapted parameter(s), a segmentation mask for the image (or another image).

26 Claims, 12 Drawing Sheets

(51) Int. Cl.
G06V 10/26 (2022.01)
G06V 10/82 (2022.01)

(58) Field of Classification Search
CPC ........ C12Q 2600/156; C12Q 2600/172; G06N
3/044; G06N 3/0464; G06N 3/084; G06N
3/0895; G06V 10/267; G06V 10/778;
G06V 10/82; G06V 20/56
See application file for complete search history.

(56) References Cited

U.S. PATENT DOCUMENTS

| | | | | |
|---|---|---|---|---|
| 12,159,410 | B2 * | 12/2024 | Ye | G06T 7/10 |
| 2021/0279950 | A1 * | 9/2021 | Phalak | G06F 18/231 |
| 2022/0066544 | A1 * | 3/2022 | Kwon | G06T 7/251 |
| 2022/0067940 | A1 * | 3/2022 | Heng | G06N 3/0464 |
| 2022/0261593 | A1 * | 8/2022 | Yu | G06F 18/214 |
| 2022/0383505 | A1 * | 12/2022 | Homayounfar | G06V 10/764 |
| 2023/0071437 | A1 * | 3/2023 | Kim | G06V 10/766 |
| 2023/0196755 | A1 * | 6/2023 | He | G06V 10/7715 |
| | | | | 382/156 |
| 2024/0010225 | A1 * | 1/2024 | Huang | B60W 60/001 |

FOREIGN PATENT DOCUMENTS

| | | | | | |
|---|---|---|---|---|---|
| JP | 2019125340 | A | * | 7/2019 | G06V 10/762 |
| JP | 2023132818 | A | * | 9/2023 | G06V 10/7747 |

OTHER PUBLICATIONS

Kai Fang et al.,"A Multitarget Interested Region Extraction Method for Wrist X-Ray Images Based on Optimized AlexNet and Two-Class Combined Model," Dec. 15, 2021, IEEE Transactions on Computational Social Systems, vol. 9, No. 6, Dec. 2022,pp. 1624-1632.*

Yunjie Xu et al.,"Dual attention-based method for occluded person re-identification," Nov. 11, 2020, Knowledge-Based Systems 212 (2021),pp. 1-11.*

Bernhard Mueller,"Machine Learning—based Image Segmentation," Apr. 2, 2018, Technical University of Munich, Germany Chair of Computational Modeling and Simulation,pp. 20-32.*

Johann Sawatzky et al.,"Harvesting Information from Captions forWeakly Supervised Semantic Segmentation," Oct. 2019, Proceedings of the IEEE/CVF International Conference on Computer Vision (ICCV), 2019,pp. 1-7.*

International Search Report and Written Opinion—PCT/US2023/071691—ISA/EPO—Nov. 15, 2023.

* cited by examiner

302

FULLY CONNECTED

304

LOCALLY CONNECTED

310

312

314

316

306

CONVOLUTIONAL

308

450

INPUT DATA — 452

454A

CONV — 456

LNorm — 458

MAX POOL — 460

454B

CONV — 456

LNorm — 458

MAX POOL — 460

FC1 — 462A

FC2 — 462B

LR — 464

CLASSIFICATION SCORE — 466

700

Obtain Features Extracted From A First Image By A Machine Learning Model During Inference
702

Determine, By The Machine Learning Model Based On The Features During Inference, At Least One Of A Plurality Of Keypoint Estimates In The First Image Or A Bounding Region Estimate Associated With An Object In The First Image
704

Generate One Or More Pseudo-Labels Based On At Least One Of The Plurality Of Keypoint Estimates Or The Bounding Region Estimate
706

Determine At Least One Self-Supervised Loss Based On At Least One Of The Plurality Of Keypoint Estimates Or The Bounding Region Estimate
708

Adapt, Based On The At Least One Self-Supervised Loss, One Or More Parameters Of The Machine Learning Model
710

Generate, Using The Machine Learning Model With The Adapted One Or More Parameters, A Segmentation Mask For The First Image Or A Second Image
712

FIG. 7

ONLINE ADAPTATION OF SEGMENTATION MACHINE LEARNING SYSTEMS

PRIORITY CLAIM

This application claims the benefit of U.S. Provisional Application No. 63/401,611, filed on Aug. 27, 2022, which is hereby incorporated by reference, in its entirety and for all purposes.

FIELD

The present disclosure generally relates to processing image data to perform segmentation (e.g., semantic segmentation, instance segmentation, etc.). For example, aspects of the present disclosure including systems and techniques for providing online adaptation (also referred to as test-time or inference-based adaptation) of segmentation machine learning systems (e.g., segmentation neural networks).

BACKGROUND

Increasingly, devices or systems (e.g., autonomous vehicles, such as autonomous and semi-autonomous vehicles, drones or unmanned aerial vehicles (UAVs), mobile robots, mobile devices such as mobile phones, extended reality (XR) devices, and other suitable devices or systems) include multiple sensors to gather information about an environment, as well as processing systems to process the information for various purposes, such as for route planning, navigation, collision avoidance, etc. An example of such a system is an Advanced Driver Assistance System (ADAS) for an autonomous or semi-autonomous vehicle.

The devices or systems can perform segmentation on the sensor data (e.g., one or more images) to generate a segmentation output (e.g., a segmentation mask or map). Based on the segmentation, objects may be identified and labeled with a corresponding classification of particular objects (e.g., humans, cars, background, etc.) within an image or video. The labeling may be performed on a per pixel basis. A segmentation mask may be a representation of the labels of the image or view. The segmentation output can then be used to perform one or more operations, such as image processing (e.g., blurring a portion of the image).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below Systems and techniques are described herein for providing online adaptation of segmentation machine learning systems (e.g., segmentation neural networks). According to at least one example, a processor-implemented method (e.g., for performing online adaptation of one or more machine learning models) is provided. The method includes: obtaining features extracted from a first image by a machine learning model during inference; determining, by the machine learning model based on the features during inference, at least one of a plurality of keypoint estimates in the first image or a bounding region estimate associated with an object in the first image; generating one or more pseudo-labels based on at least one of the plurality of keypoint estimates or the bounding region estimate; determining at least one self-supervised loss based on at least one of the plurality of keypoint estimates or the bounding region estimate; adapting, based on the at least one self-supervised loss, one or more parameters of the machine learning model; and generating, using the machine learning model with the adapted one or more parameters, a segmentation mask for the first image or a second image.

In another example, an apparatus for performing online adaptation of one or more machine learning models is provided. The apparatus includes at least one memory and at least one processor (e.g., configured in circuitry) coupled to the at least one memory and configured to: obtain features extracted from a first image by a machine learning model during inference; determine, using the machine learning model based on the features during inference, at least one of a plurality of keypoint estimates in the first image or a bounding region estimate associated with an object in the first image; generate one or more pseudo-labels based on at least one of the plurality of keypoint estimates or the bounding region estimate; determine at least one self-supervised loss based on at least one of the plurality of keypoint estimates or the bounding region estimate; adapt, based on the at least one self-supervised loss, one or more parameters of the machine learning model; and generate, using the machine learning model with the adapted one or more parameters, a segmentation mask for the first image or a second image.

In another example, a non-transitory computer-readable medium is provided for performing online adaptation of one or more machine learning models. The computer-readable medium has stored thereon instructions that, when executed by at least one processor, cause the at least one processor to: obtain features extracted from a first image by a machine learning model during inference; determine, using the machine learning model based on the features during inference, at least one of a plurality of keypoint estimates in the first image or a bounding region estimate associated with an object in the first image; generate one or more pseudo-labels based on at least one of the plurality of keypoint estimates or the bounding region estimate; determine at least one self-supervised loss based on at least one of the plurality of keypoint estimates or the bounding region estimate; adapt, based on the at least one self-supervised loss, one or more parameters of the machine learning model; and generate, using the machine learning model with the adapted one or more parameters, a segmentation mask for the first image or a second image.

In another example, an apparatus for performing online adaptation of one or more machine learning models is provided. The apparatus includes: means for obtaining features extracted from a first image by a machine learning model during inference; means for determining, by the machine learning model based on the features during inference, at least one of a plurality of keypoint estimates in the first image or a bounding region estimate associated with an object in the first image; means for generating one or more pseudo-labels based on at least one of the plurality of keypoint estimates or the bounding region estimate; means for determining at least one self-supervised loss based on at least one of the plurality of keypoint estimates or the bounding region estimate; means for adapting, based on the at least one self-supervised loss, one or more parameters of the machine learning model; and means for generating, using the machine learning model with the adapted one or more parameters, a segmentation mask for the first image or a second image.

In some aspects, one or more of the apparatuses described herein is, is part of, and/or includes a vehicle or a computing device or component of a vehicle (e.g., an autonomous vehicle), a mobile device (e.g., a mobile telephone or so-called "smart phone" or other mobile device), an extended reality (XR) device (e.g., a virtual reality (VR) device, an augmented reality (AR) device, or a mixed reality (MR) device), a camera, a wearable device (e.g., a network-connected watch, etc.), a personal computer, a laptop computer, a server computer, or other device. In some aspects, the apparatus(es) include a camera or multiple cameras for capturing one or more images. In some aspects, the apparatus(es) further includes a display for displaying one or more images, notifications, and/or other displayable data. In some aspects, the apparatus(es) described herein can include one or more sensors (e.g., one or more inertial measurement units (IMUs), such as one or more gyroscopes, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 7 is a flow diagram illustrating an example of a process for processing one or more images, in accordance with aspects of the present disclosure.

DETAILED DESCRIPTION

Figure 1A:
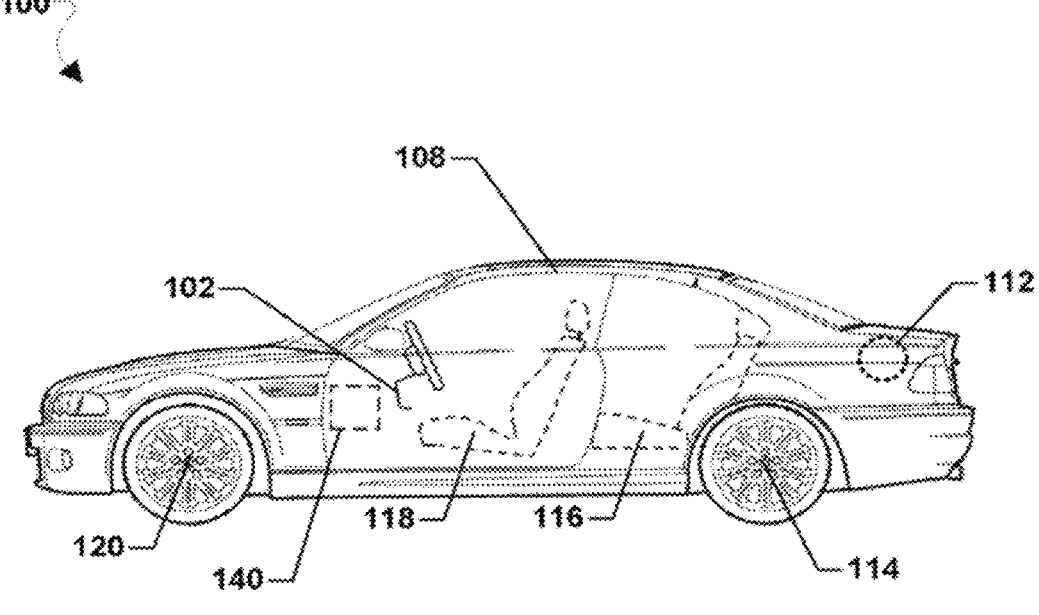
FIGS. 1A and 1B are block diagrams illustrating a vehicle suitable for implementing various aspects, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

In some cases, an image or video frame may be processed to identify one or more objects present within the image or video frame, such as prior to performing one or more operations on the image or video (e.g., autonomous or semi-autonomous driving operations, applying effects to an image, etc.). For example, adding a virtual background to a video conference may include identifying objects (e.g., one or more people, buildings, vehicles, etc.) in the foreground and modifying all portions of the video frames other than the pixels that belong to the objects. In some cases, objects in an image may be identified by using one or more neural networks or other machine learning (ML) models to assign segmentation classes or labels (e.g., person, class, car class, background class, etc.) to each pixel in a frame and then grouping contiguous pixels sharing a segmentation class to form an object of the segmentation class (e.g., a person, car, background, etc.). Such a technique may be referred to as pixel-wise segmentation. The classes or labels assigned to each pixel can be referred to as pixel-wise classes or labels, which may collectively be referred to as a segmentation mask (also referred to herein as a segmentation map).

An example of a type of segmentation is semantic segmentation. Semantic segmentation treats multiple objects of the same class as a single entity or instance (e.g., all detected people within an image are treated as a "person" class). Another type of segmentation is instance segmentation. Instance segmentation considers multiple objects of the same class as distinct entities or instances (e.g., a first person detected in an image is a second instance of a "person" class and a second person detected in an image is a second instance of the "person" class).

In some cases, pixel-wise segmentation may involve inputting an image into an ML model, such as a convolutional neural network (CNN). The ML model may process the inputted image and output a segmentation mask or map for the image. As noted previously, the segmentation mask may include segmentation class information (e.g., a pixel-wise class or label) for each pixel in the frame. In some cases, the segmentation mask may be configured to keep information only for pixels corresponding to one or more classes (e.g., for pixels classified as a person), isolating the selected classified pixels from other classified pixels (e.g., isolating person pixels from background pixels).

Segmentation networks may perform poorly in some situations, such as if a test image exhibits a large domain-shift with respect to a training dataset used to train the segmentation networks (e.g., indoor as compared to outdoor or daylight or as compared to nighttime). For instance, for human instance segmentation, such a domain-shift may be due to severe occlusion of human subjects in the test image. However, despite poor segmentation performance of segmentation networks in such situations, segmentation networks tend to estimate keypoints of objects well.

ML models, such as neural networks, can be trained offline using training techniques, such as supervised learning, unsupervised learning, semi-supervised learning, and/or other types of training techniques. During such offline training, parameters (e.g., weights, biases, etc.) of an ML model are tuned based on one or more loss functions. In some cases, the parameters of ML models may be adapted or fine-tuned during inference or test-time (referred to as online adaptation or fine-tuning, test-time adaptation or fine-tuning, or inference-based adaptation or fine-tuning).

Many online adaptation methods for ML models that are trained to generate segmentation masks use pixel pseudo-labels. For instance, a mask head of a neural network that is trained to generate a segmentation mask may generate a segmentation mask, with each pixel of the segmentation mask being labeled with a class determined by the segmentation mask. The labeled pixels may be used as the pseudo-labels. The pseudo-labels may then be used to perform online adaptation of the parameters of the ML model. However, such pixel pseudo-labels are inherently unreliable. Further, ML models (e.g., a deep neural network (DNN) may misclassify a pixel with high confidence. In contrast, higher-level attributes, such as bounding regions (e.g., bounding boxes, which can be denoted as Bbox) and keypoints, are more reliable and may thus provide better candidates for pseudo-labels. Furthermore, many segmentation ML models have a common feature extractor and may include multiple parallel heads (e.g., a keypoints head and an object detection head), in which case the generation of bounding regions (e.g., bounding boxes) and keypoints would be available with negligible overhead.

Systems, apparatuses, electronic devices, methods (also referred to as processes), and computer-readable media (collectively referred to herein as "systems and techniques") are described herein that provide a solution for performing online adaptation of segmentation machine learning systems (e.g., segmentation neural networks). Online adaptation may also be referred to herein as test-time adaptation (TTA) or inference-based adaptation or fine-tuning of a machine learning system (e.g., neural network). For instance, the systems and techniques may perform online adaptation of object segmentation ML models (e.g., human segmentation networks) using bounding regions (e.g., object poses depicted by bounding regions, such as human poses) and/or keypoints.

Various aspects of the application will be described with respect to the figures.

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. Other examples of systems or devices that can be used to perform the techniques described herein may include mobile devices (e.g., a mobile telephone or so-called "smart phone" or other mobile device), XR devices (e.g., a VR device, an AR device, an MR device, etc.), cameras, wearable devices (e.g., a network-connected watch, etc.), and/or other type of systems or devices.

Figure 1B:
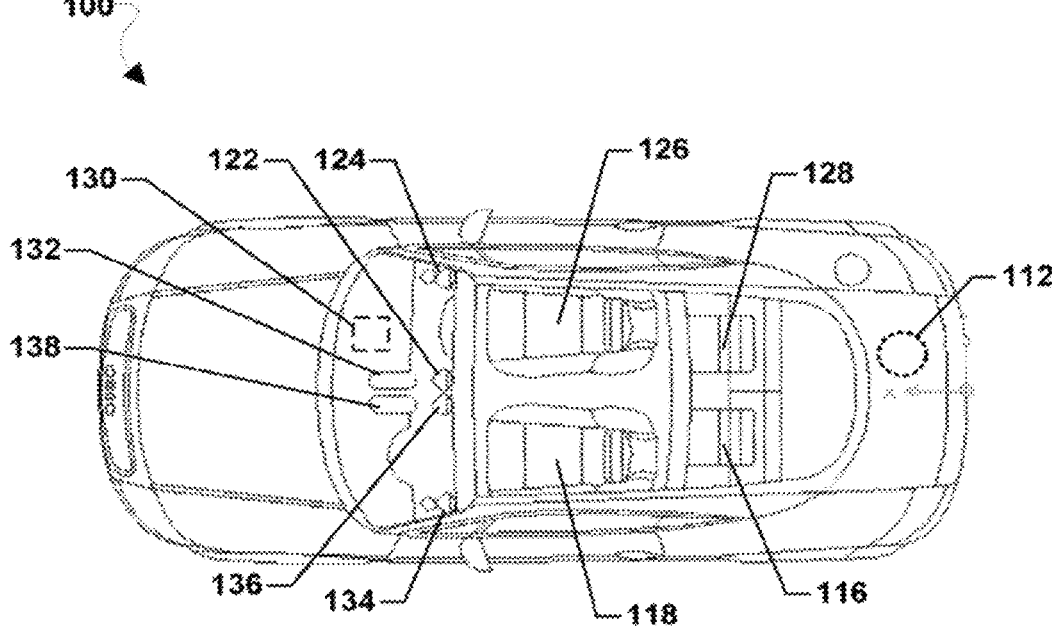

FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various aspects using information received from various sensors, particularly the cameras 122, 136, radar 132, and lidar 138. In some aspects, the control unit 140 may supplement the processing of camera images using distance and relative position information (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using various aspects.

Figure 1C:
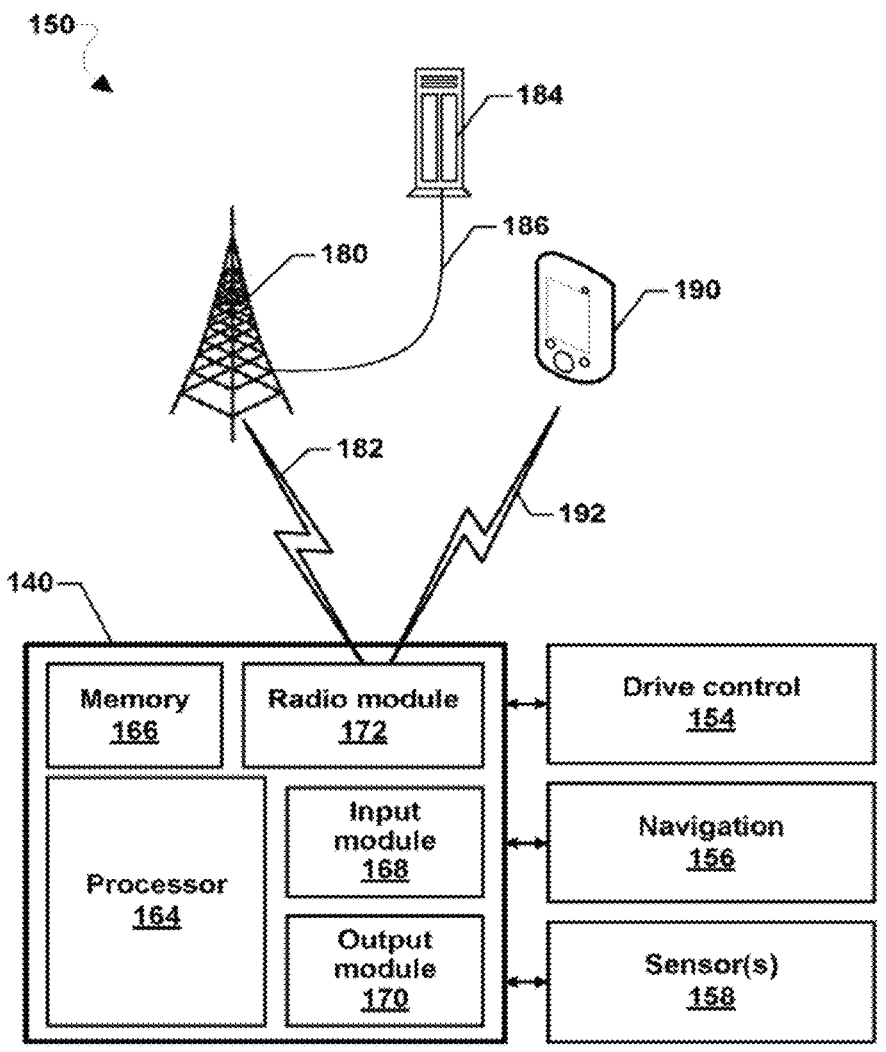
FIG. 1C is a block diagram illustrating components of a vehicle suitable for implementing various aspects, in accordance with aspects of the present disclosure.

FIG. 1C is a component block diagram illustrating a system 150 of components and support systems suitable for implementing various aspects. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various aspects. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some aspects, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various aspects, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described and may be configured to provide a variety of data to the processor 164.

While the control unit 140 is described as including separate components, in some aspects some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various aspects when installed into a vehicle.

Figure 1D:
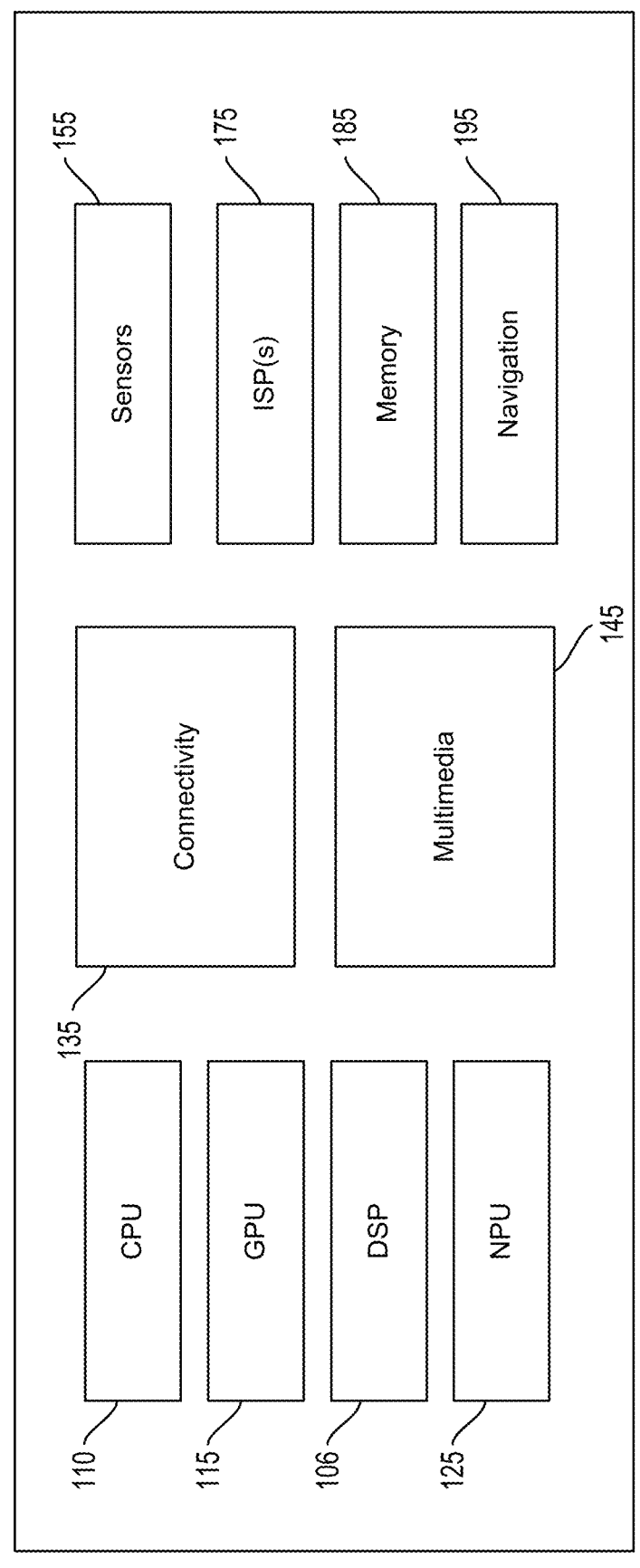
FIG. 1D illustrates an example implementation of a system-on-a-chip (SOC), in accordance with some examples.

FIG. 1D illustrates an example implementation of a system-on-a-chip (SOC) 105, which may include a central processing unit (CPU) 110 or a multi-core CPU, configured to perform one or more of the functions described herein. In some cases, the SOC 105 may be based on an ARM instruction set. In some cases, CPU 110 may be similar to processor 164. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with a CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from a memory block 185.

The SOC 105 may also include additional processing blocks tailored to specific functions, such as a GPU 115, a DSP 106, a connectivity block 135, which may include fifth generation (5G) connectivity, fourth generation long term evolution (4G LTE) connectivity, Wi-Fi connectivity, USB connectivity, Bluetooth connectivity, and the like, and a multimedia processor 145 that may, for example, detect and recognize gestures. In one implementation, the NPU is implemented in the CPU 110, DSP 106, and/or GPU 115. The SOC 105 may also include a sensor processor 155, image signal processors (ISPs) 175, and/or navigation module 195, which may include a global positioning system. In some cases, the navigation module 195 may be similar to navigation components 156 and sensor processor 155 may accept input from, for example, one or more sensors 158. In some cases, the connectivity block 135 may be similar to the radio module 172.

Figure 2A:
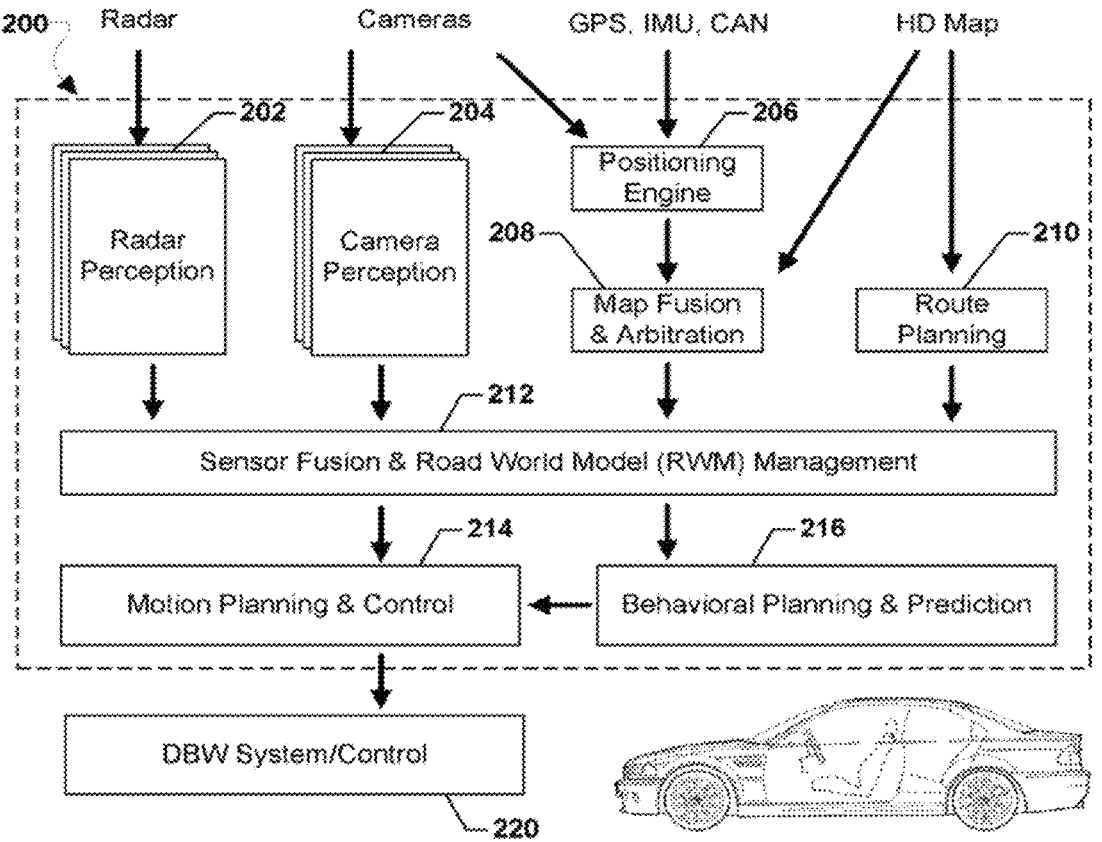
FIG. 2A is a component block diagram illustrating components of an example vehicle management system according to various aspects.

FIG. 2A illustrates an example of vehicle applications, subsystems, computational elements, or units within a vehicle management system 200, which may be utilized within a vehicle, such as vehicle 100 of FIG. 1A. With reference to FIGS. 1A-2A, in some aspects, the various vehicle applications, computational elements, or units within vehicle management system 200 may be implemented within a system of interconnected computing devices (e.g., subsystems), that communicate data and commands to each other. In other aspects, the vehicle management system 200 may be implemented as a plurality of vehicle applications executing within a single computing device, such as separate threads, processes, algorithms, or computational elements. However, the use of the term vehicle applications in describing various aspects are not intended to imply or require that the corresponding functionality is implemented within a single autonomous (or semi-autonomous) vehicle management system computing device, although that is a potential implementation aspect. Rather the use of the term vehicle applications is intended to encompass subsystems with independent processors, computational elements (e.g., threads, algorithms, subroutines, etc.) running in one or more computing devices, and combinations of subsystems and computational elements.

In various aspects, the vehicle applications executing in a vehicle management system 200 may include (but is not limited to) a radar perception vehicle application 202, a camera perception vehicle application 204, a positioning engine vehicle application 206, a map fusion and arbitration vehicle application 208, a route vehicle planning application 210, sensor fusion and road world model (RWM) management vehicle application 212, motion planning and control vehicle application 214, and behavioral planning and prediction vehicle application 216. The vehicle applications 202-216 are merely examples of some vehicle applications in an example configuration of the vehicle management system 200. In other configurations consistent with various aspects, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system 200. Each of the vehicle applications 202-216 may exchange data, computational results and commands.

The vehicle management system 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle steering, throttle and brake controls. The configuration of the vehicle management system 200 and DBW system/control unit 220 illustrated in FIG. 2A is merely an example configuration and other configurations of a vehicle management system and other vehicle components may be used in the various aspects. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., 132) and/or lidar (e.g., 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., 122, 136), and process the data to recognize and determine locations of other vehicles and objects within a vicinity of the vehicle 100. The camera perception vehicle application 204 may include use of neural network processing and artificial intelligence methods to recognize objects and vehicles and pass such information on to the sensor fusion and RWM management vehicle application 212.

The positioning engine vehicle application 206 may receive data from various sensors and process the data to determine a position of the vehicle 100. The various sensors may include, but is not limited to, GPS sensor, an IMU, and/or other sensors connected via a CAN bus. The positioning engine vehicle application 206 may also utilize inputs from one or more cameras, such as cameras (e.g., 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc. The HD map database may be stored in a memory (e.g., memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, camera perception vehicle application 204, map fusion and arbitration vehicle application 208, and route planning vehicle application 210, and use some or all of such inputs to estimate or refine the location and state of the vehicle 100 in relation to the road, other vehicles on the road, and other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element (s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through C-V2X connections, other wireless connections, etc.

As a still further example, the sensor fusion and RWM management vehicle application 212 may monitor perception data from various sensors, such as perception data from a radar perception vehicle application 202, camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control unit 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216 and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control unit 220.

The DBW system/control unit 220 may receive the commands or instructions from the motion planning and control vehicle application 214 and translate such information into mechanical control signals for controlling wheel angle, brake, and throttle of the vehicle 100. For example, DBW system/control unit 220 may respond to the computed steering wheel command angle by sending corresponding control signals to the steering wheel controller.

In various aspects, the vehicle management system 200 may include functionality that performs safety checks or oversight of various commands, planning or other decisions of various vehicle applications that could impact vehicle and occupant safety. Such safety checks or oversight functionality may be implemented within a dedicated vehicle application or distributed among various vehicle applications and included as part of the functionality. In some aspects, a variety of safety parameters may be stored in memory, and the safety checks or oversight functionality may compare a determined value (e.g., relative spacing to a nearby vehicle, distance from the roadway centerline, etc.) to corresponding safety parameter(s) and issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter and issue an override command and/or alarm in response to the commanded angle exceeding the safe wheel angle limit.

Some safety parameters stored in memory may be static (e.g., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
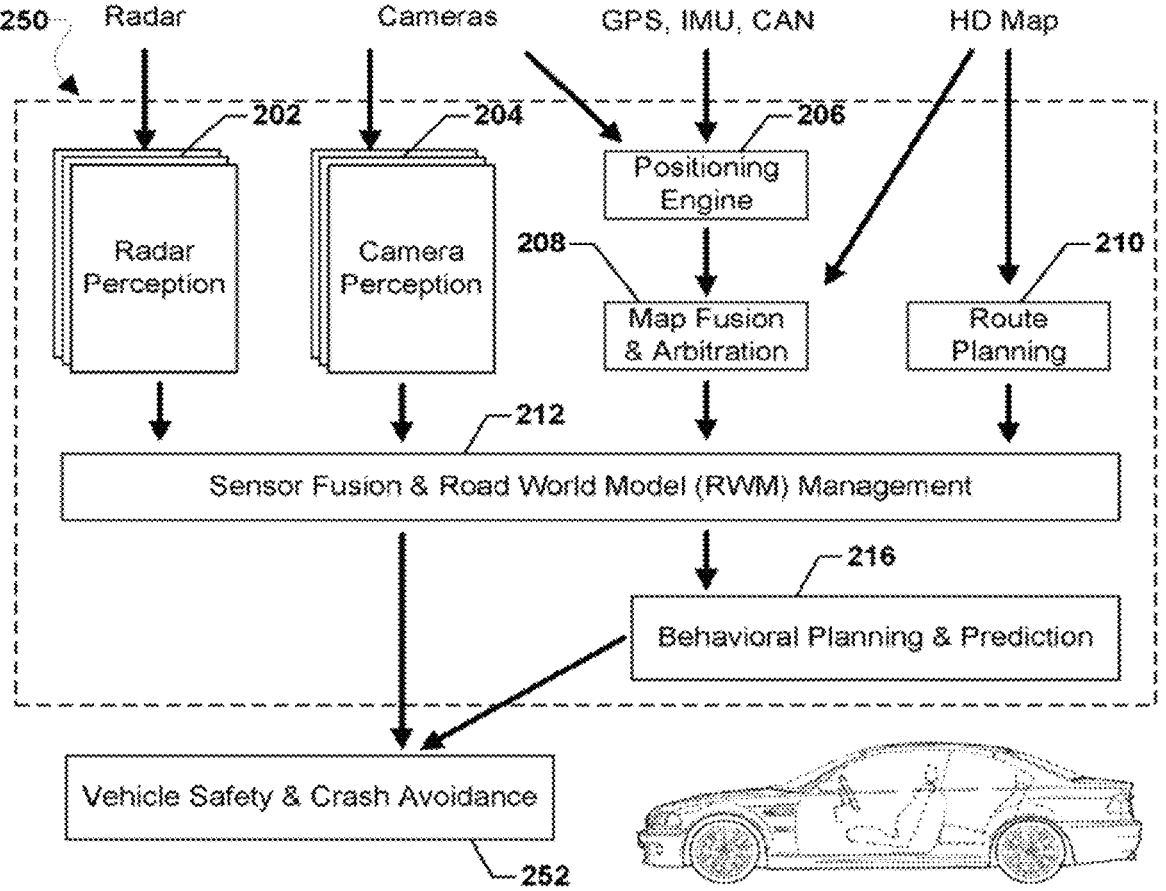
FIG. 2B is a component block diagram illustrating components of another example vehicle management system according to various aspects.

FIG. 2B illustrates an example of vehicle applications, subsystems, computational elements, or units within a vehicle management system 250, which may be utilized within a vehicle 100. With reference to FIGS. 1A-2B, in some aspects, the vehicle applications 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various aspects, the behavioral planning and prediction vehicle application 216 and/or sensor fusion and RWM management vehicle application 212 may output data to the vehicle safety and crash avoidance system 252. For example, the sensor fusion and RWM management vehicle application 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various aspects, the vehicle safety and crash avoidance system 252 may include functionality that performs safety checks or oversight of various commands, planning, or other decisions of various vehicle applications, as well as human driver actions, that could impact vehicle and occupant safety. In some aspects, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter and issue an override command and/or alarm in response to the steering wheel angle exceeding the safe wheel angle limit.

As indicated above, segmentation may be performed on image data (e.g., standalone images or video frames of a video) to generate a segmentation mask for the image data. In some cases, one or more machine learning techniques may be used to perform the segmentation, such as using one or more neural networks. A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 3A-FIG. 4.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
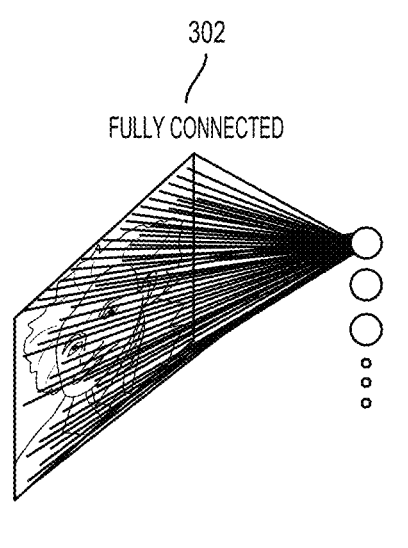
FIG. 3A-FIG. 4 are diagrams illustrating examples of neural networks, in accordance with some examples.
Figure 3B:
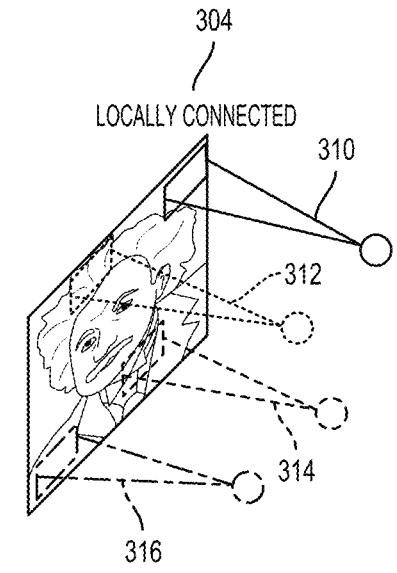

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer because the higher layer neurons in a given region may receive inputs that are tuned through training to the properties of a restricted portion of the total input to the network.

Figure 3C:
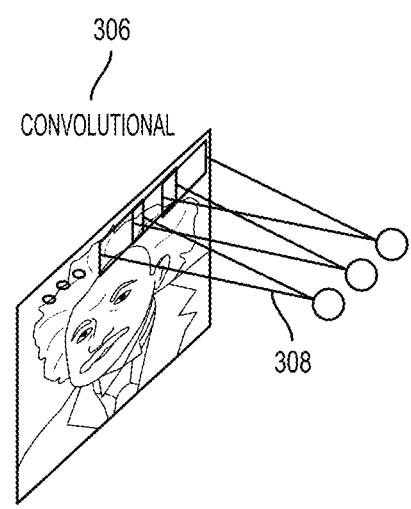

An example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of video compression and/or decompression, according to aspects of the present disclosure.

Figure 3D:
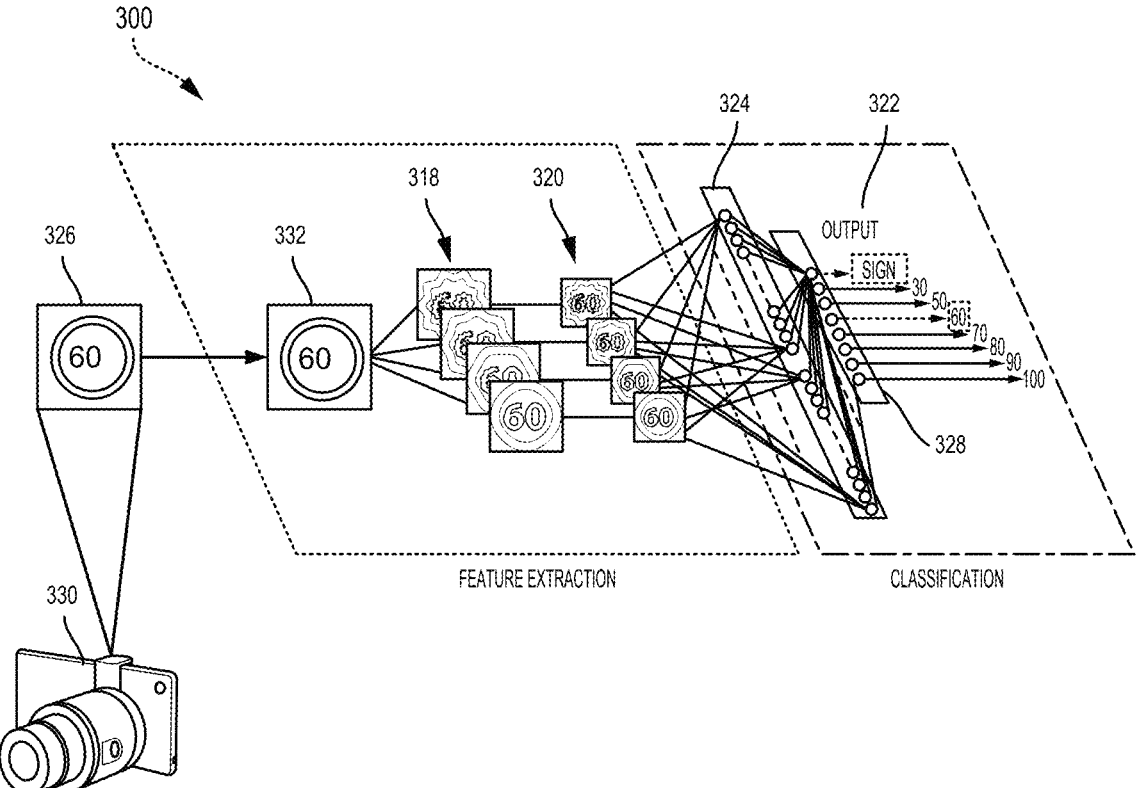

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 4:
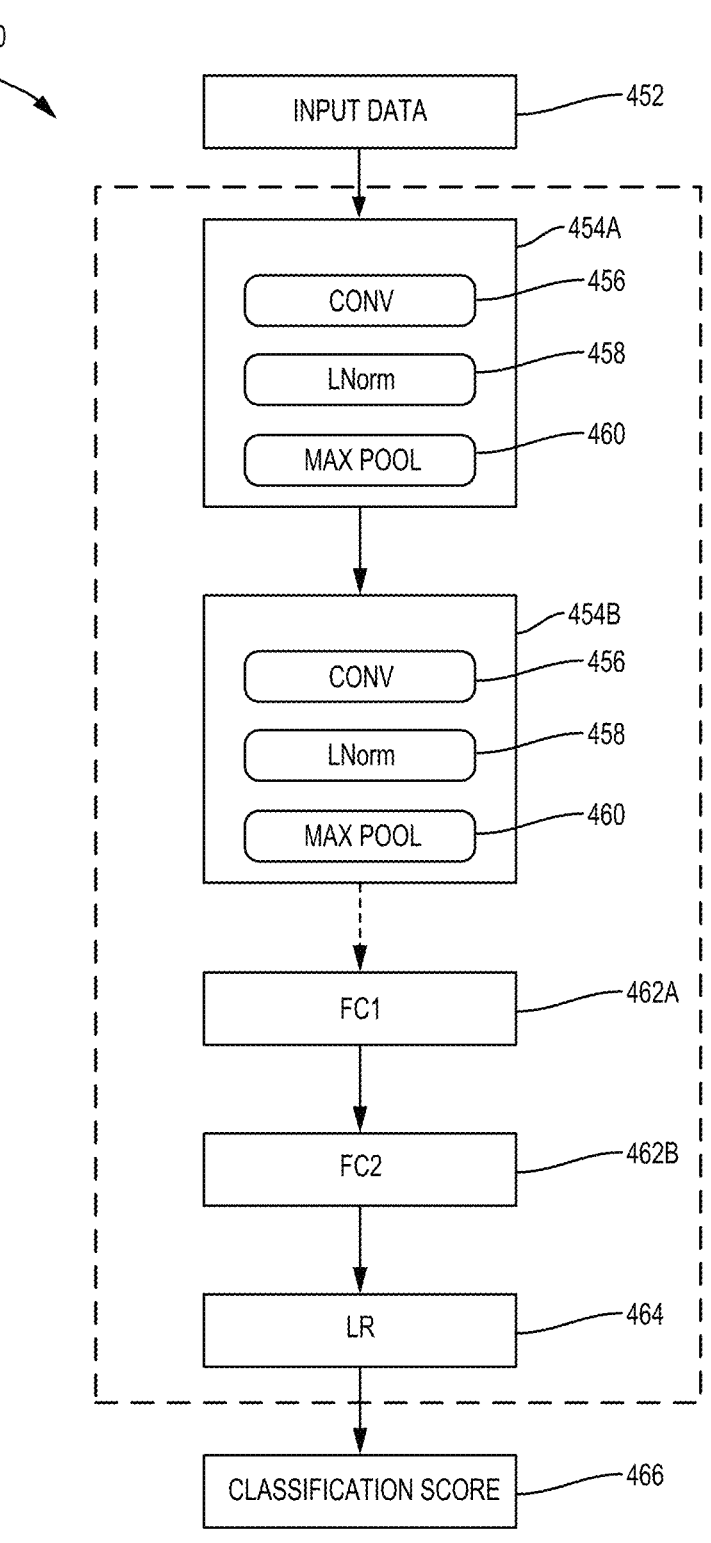

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data 452 to generate a feature map. Although only two convolution blocks 454A, 454B are shown, the present disclosure is not so limiting, and instead, any number of convolution blocks (e.g., convolution blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 110 or GPU 115 of an SOC 105 to achieve high performance and low power consumption. In alternative aspects, the parallel filter banks may be loaded on the DSP 106 or an ISP 175 of an SOC 105. In addition, the deep convolutional network 450 may access other processing blocks that may be present on the SOC 105, such as sensor processor 155 and navigation module 195, dedicated, respectively, to sensors and navigation.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

As noted above, ML models or systems, such as neural networks, are trained offline using training techniques, such as supervised learning, to tune parameters (e.g., weights, biases, etc.) of the ML model. In some cases, the parameters of ML models may be adapted or fine-tuned during inference or test-time by performing online adaptation (or test-time adaptation (TTA) or inference-based adaptation). Many segmentation ML models (e.g., a segmentation neural network, such as a deep neural network) trained to generate segmentation masks utilize pixel pseudo-labels for the online adaptation. However, such pixel pseudo-labels are inherently unreliable, and the segmentation ML models may misclassify a pixel with high confidence.

Other attributes that can be provided by a segmentation ML model, such as bounding regions (e.g., bounding boxes that may depict or define a location and/or pose of an object in an image) and keypoints, may be more reliable and may provide better candidates for pseudo-labels that can be used in online adaptation of the ML model. Further, because segmentation ML models generally have a common feature-extractor and multiple parallel heads (e.g., a keypoints head and an object detection head), generation of the bounding regions (e.g., bounding boxes) and keypoints can be performed without significant overhead.

As previously noted, systems and techniques are described herein that provide a solution for online adaptation of segmentation machine learning systems (e.g., segmentation neural networks) using bounding regions (or object poses, such as human poses, depicted by bounding regions) and/or keypoints.

Figure 5:
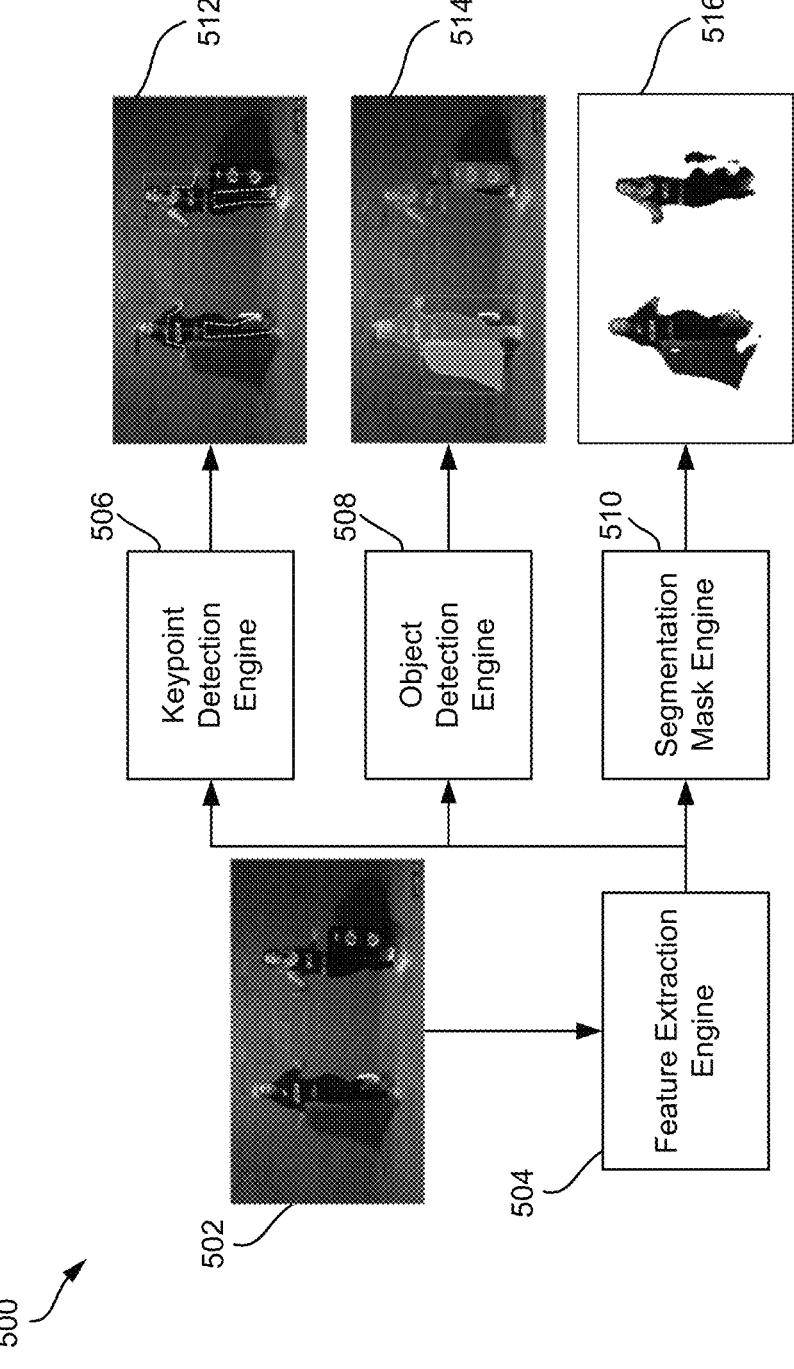
FIG. 5 is a diagram illustrating an example of a segmentation machine learning system, in accordance with aspects of the present disclosure.

FIG. 5 is a diagram illustrating an example of a segmentation machine learning system 500. The segmentation machine learning system 500 may include a deep neural network that includes various neural network layers. As shown, the segmentation machine learning system 500 includes a feature extraction engine 504, a keypoint detection engine 506, an object detection engine 508, and a segmentation mask engine 510. The feature extraction engine 504, the keypoint detection engine 506, the object detection engine 508, and the segmentation mask engine 510 may include separate machine learning models or systems (e.g., different neural network models with different sets of layers), may be part of a single machine learning model or system (e.g., part of a single neural network model), or some of the components themselves may be combined into a single entity.

The feature extraction engine 504 may obtain an input image 502. For example, the feature extraction engine 504 may receive the input image 502 from a camera (e.g., camera 122, camera 136, etc.) of a device including the system 500 or another device, may retrieve the input image 502 from memory of the device including the system 500 or another device or system, or otherwise obtain the input image 502. The input image 502 may be a standalone image (e.g., a photograph) or may be a video frame of a video that includes multiple video frames. The feature extraction engine 504 is configured to process the input image 502 to extract or determine features from the input image 502.

In some aspects, the feature extraction engine 504 may include an ML model, such as a neural network. For instance, the feature extraction engine 504 may include various hidden layers (e.g., convolutional layers, normalization layers, etc.) that generate feature maps based on inputs from earlier layers (e.g., the input image 502, feature maps output from earlier hidden layers, etc.). The feature maps (or more generally "features") represent the input image 502 in different layers of abstraction. Illustrative examples of neural networks that may be used to implement the feature extraction engine 504 include the fully connected neural network 302 of FIG. 3A, the locally connected neural network 304 of FIG. 3B, the convolutional neural network 306 of FIG. 3C, the deep convolutional network (DCN) 300 of FIG. 3D, other type of ML model.

The feature extraction engine 504 may then output the extracted features (e.g., features or one or more feature maps from a final (or other) layer of the feature extraction engine 504). According to various aspects, the feature extraction engine 504 may output the extracted features to the keypoint detection engine 506, the object detection engine 508, and the segmentation mask engine 510. In some cases, the keypoint detection engine 506 may be referred to as a keypoint head, the object detection engine 508 may be referred to as a detection head, and/or the segmentation mask engine 510 may be referred to as a segmentation head.

The keypoint detection engine 506 is configured to process the features from the feature extraction engine 504 to generate keypoint estimates (e.g., as depicted in image 512) of one or more objects in the input image 502. For instance, as shown in FIG. 5, the input image 502 includes two people. The keypoint detection engine 506 may generate keypoint estimates for a particular number of keypoints of each of the two people. In some cases, the keypoint detection engine 506 may generate keypoint estimates for, for example, 17 keypoints of each person, including one keypoint for each eye (a total of two keypoints for the eyes), one keypoint for each ear (a total of two keypoints for the ears), one keypoint for the nose, one keypoint for each wrist (a total of two keypoints for the wrists), one keypoint for each elbow (a total of two keypoints for the elbows), one keypoint for each shoulder (a total of two keypoints for the shoulders), one keypoint for each hip (a total of two keypoints for the hips), one keypoint for each knee (a total of two keypoints for the knees), one keypoint for each ankle (a total of two keypoints for the ankles). In other cases, the keypoint detection engine 506 can generate keypoint estimates for additional or fewer keypoints.

In some aspects, the keypoint estimates may include coordinates identifying a location of each keypoint. In some cases, the keypoint estimates may include one or more heatmaps for the keypoints, such as one heatmap per keypoint (e.g., 17 heatmaps in the example of 17 keypoints from above). In some examples, a bounding region (e.g., a bounding box or other region) may be determined or identified around the person, and the heat maps may be generated from the bounding region. For instance, the bounding region may be divided into a grid including a number of cells making up the heatmap. In some aspects, the bounding regions (e.g., bounding box) may be output from the object detection engine 508. In other aspects, the keypoint detection engine 506 and the object detection engine 508 may be combined, in which case the keypoint detection engine 506 can generate the bounding regions.

As noted above, a respective heatmap with the grid of cells may be generated for each of the keypoints (e.g., a first heatmap for a first keypoint, a second heatmap for a second keypoint, etc.). For a heatmap associated with a particular keypoint, each cell of the heatmap grid may include a probability (or other measure of likelihood) that the cell includes the keypoint associated with that heatmap (e.g., how likely it is that a particular cell includes features associated with the left eye of the user).

The object detection engine 508 (and/or the keypoint detection engine 506, as discussed above) is configured to process the features from the feature extraction engine 504 to detect one or more objects in the input image 502, such as the two people in the input image. For instance, as shown in image 514 of FIG. 5, the object detection engine 508 may output a bounding region (e.g., a bounding box) representing a location and/or pose of each object (e.g., a bounding box for the first person in the input image 502 and a bounding box for the second person in the input image 502).

The segmentation mask engine 510 is configured to process the features from the feature extraction engine 504 to generate a segmentation mask for the input image 502. For example, as shown in image 516 of FIG. 5, the segmentation mask engine 510 may output a segmentation mask that classifies pixels of the image into different classes (e.g., a semantic segmentation) and/or different instances (e.g., an instance segmentation).

In some aspects, the outputs of the keypoint detection engine 506, the object detection engine 508, and the segmentation mask engine 510 may be used for one or more operations (e.g., by one or more additional engines not shown in FIG. 5). In some cases, in an XR (e.g., AR, VR, etc.) system, one or more segmentation masks may be used for extracting one or more people from a background of a scene and inserting the people on a virtual scene. In such cases, the keypoints may be used by a posture engine that models a posture of each of the people (e.g., to determine an action of each of the people). Having the keypoint detection engine 506, the object detection engine 508, and the segmentation mask engine 510 operate based on features from the common backbone feature extraction engine 504 may provide various advantages. An example of an advantage is that individual datasets (e.g., images with keypoints and/or mask annotations) may be small and insufficient for training a backbone, whereas having a common backbone allows all datasets to be pulled together. Another example of an advantage to having a common backbone is that it can save computations as the feature map is computed once and used by the different engines.

Figure 6:
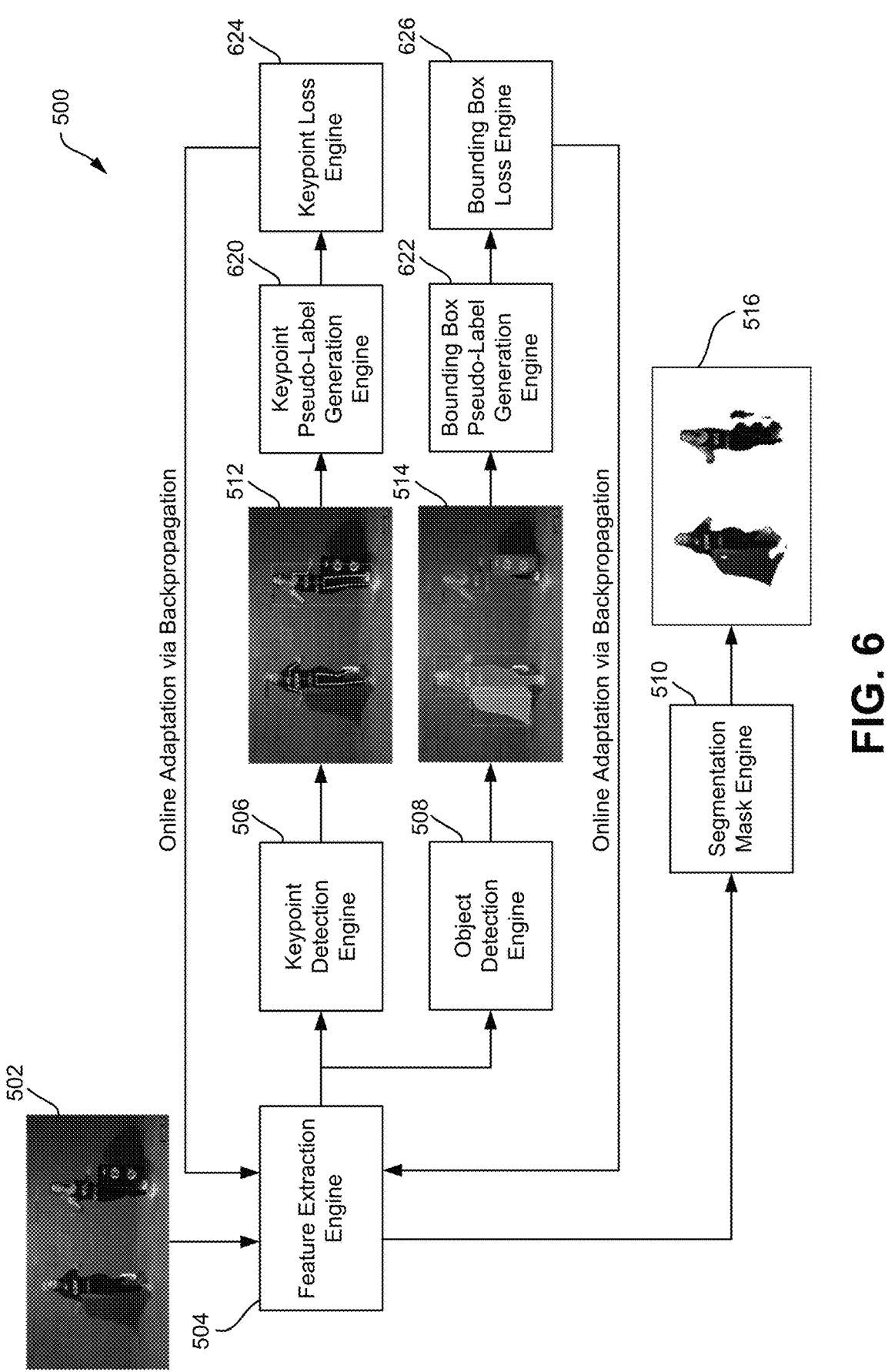
FIG. 6 is a diagram illustrating an example of a segmentation machine learning system that can perform online (or test-time or inference-based) adaptation, in accordance with aspects of the present disclosure.

FIG. 6 is a diagram illustrating an example of a segmentation machine learning system 500 performing online (or test-time or inference-based) adaptation. As shown, the segmentation machine learning system 500 may additionally include a keypoint pseudo-label generation engine 620, a bounding box pseudo-label generation engine 622, a keypoint loss engine 624, and a bounding box loss engine 626.

In some cases, the segmentation machine learning system 500 may include the keypoint pseudo-label generation engine 620 and the keypoint loss engine 624, and the segmentation machine learning system 500 may not include the bounding box pseudo-label generation engine 622 and the bounding box loss engine 626. In other cases, the segmentation machine learning system 500 may include the bounding box pseudo-label generation engine 622 and the bounding box loss engine 626, and the segmentation machine learning system 500 may not include the keypoint pseudo-label generation engine 620 and the keypoint loss engine 624. In some cases, the keypoint pseudo-label generation engine 620 and/or the bounding box pseudo-label generation engine 622 may include a function (e.g., a neural network, a software program, or other function) or separate functions that are configured (e.g., trained etc.) to generate pseudo-labels.

The keypoint pseudo-label generation engine 620 may generate pseudo-labels (referred to as keypoint pseudo-labels) from the keypoint estimates output by the keypoint detection engine 506. In some cases, the keypoint pseudo-label generation engine 620 may utilize individual keypoint thresholding (e.g., a keypoint scoring above a score threshold is accepted) or object-based keypoints thresholding (e.g., a score is computed for an object's set of keypoints collectively). In some examples, object-based keypoints thresholding can include person-based keypoints thresholding, such as using a score computed for all keypoints of a person class collectively. In some aspects of individual keypoint thresholding, each cell of a heatmap grid may be compared to a score threshold (which may be referred to as an individual keypoint score threshold), such as a value of 0.7, 0.8, 0.9, or other value. If a cell of the heatmap grid is greater than (or equal to in some cases) the individual keypoint score threshold, the cell of the heatmap can be used to generate a keypoint pseudo-label. For instance, a value of 1 can be added to the cell of the heatmap and used as a keypoint pseudo-label. Any grid that is determined to be less than (or equal to in some cases) can be disregarded and not used as a keypoint pseudo-label. In some cases, the keypoint detection engine 506 can predict if each keypoint is visible or occluded, which may lead to system improvement (e.g., generating more accurate pseudo-labels).

The bounding box pseudo-label generation engine 622 may generate pseudo-labels (referred to as bounding box pseudo-labels) from the bounding box estimates output by the object detection engine 508 (and/or the keypoint detection engine 506). For example, an object detection loss that is used to train the object detection engine 508 during offline training can compare estimates of the network for each bounding box (e.g., four numbers giving the height and widths of the upper-left and lower-right corners of that bounding box in the image) and the ground-truth (or label) for those same four numbers and measure the discrepancy between them (e.g., L2 norm of the difference between ground-truth and estimated corners). To use estimated bounding boxes as ground-truth during online adaptation, the system 500 can select bounding boxes from the object detection engine 508 for which the system 500 has high confidence (e.g., a confidence or objectness-score the object detection engine 508 estimates for each of the detected bounding box estimates is greater than or equal to a bounding box confidence threshold), and the system 500 may pass estimated coordinates for their corners as ground-truth for the online adaptation. Such a solution can inform the system 500 which objects were real and therefore their confidence or objectness-score need to be increased, and inform the system 500 which objects were erroneously detected such that their absence from the pseudo-labels reduces their objectness score in the next run.

The keypoint loss engine 624 can use the keypoint pseudo-labels in a loss function to determine a keypoint-based loss, which may be considered as a self-supervised loss. Similarly, the bounding box loss engine 626 can use the bounding box pseudo-labels in a loss function to determine a bounding box-based loss (e.g., a self-supervised loss). The keypoint loss engine 624 and the bounding box loss engine 626 may use the same loss function or may use different loss functions. Illustrative examples of loss functions that can be used by the keypoint loss engine 624 and/or the bounding box loss engine 626 include a mean absolute error (MAE) loss (also referred to as an L1 loss), a mean square error (MSE) loss (also referred to as an L2 loss), a cross-entropy loss, any combination thereof, and/or other loss functions. In some cases, the same loss function used to train the segmentation machine learning system 500 during offline training may be used for the online adaptation. In such cases, the original ground truth values (or labels) used in the loss function may be replaced with the pseudo-labels. In other cases, a loss function used for the online adaptation may be different than the loss function used to train the segmentation machine learning system 500 during offline training. In either of the cases, the pseudo-labels may be compared to the output of the keypoint detection engine 506 to determine the keypoint-based loss.

Backpropagation can then be performed using the keypoint-based loss and/or the bounding box-based loss to adapt or fine-tune the previously trained parameters (e.g., weights, biases, etc. tuned during offline training) of the feature extraction engine 504. In some cases, the previously trained parameters of the keypoint detection engine 506, the object detection engine 508, and/or the segmentation mask engine 510 can be adapted or fine-tuned using the keypoint-based loss and/or the bounding box-based loss Using the updated or fine-tuned parameters (e.g., based on the keypoint-based loss and/or bounding box-based loss), the feature extraction engine 504 can process the input image 502 again to generate adapted features (e.g., an adapted feature map) representing the input image 502. The segmentation mask engine 510 can process the adapted features to generate an adapted segmentation mask for the input image 502. The adapted segmentation mask can be of higher quality (e.g., fewer segmentation errors) as compared to a segmentation mask generated by the segmentation mask engine 510 using the previous features output by the feature extraction engine 504 prior to the online adaptation). In some cases, additionally or alternatively, the feature extraction engine 504 can process one or more new input images to generate a respective feature map representing the one or more new input images.

In some aspects, the online adaptation (e.g., test-time adaptation) performed by the systems and techniques described herein may use a fully trained object (e.g., human, vehicle, etc.) instance-segmentation/keypoints-estimation network, which can be referred to as $m=\{m_b, m_m, m_k\}$, and a single unlabelled test-image. The systems and techniques may also allow for test-time adaptation of network weights using backpropagation, but without access to the source dataset. These assumptions can make the test-time adaptation setup very realistic, but simultaneously very challenging. In some examples, illustrative steps of the test-time adaptation method are shown in Algorithm 1 below:

---

Algorithm 1: TTA (test-time adaption)

---

Given: Model $m = \{m_b, m_m, m_k\}$, test-image $x^{tgt}$
Step 1 (test-time): Adapt backbone to test image
    Initialize n, i ← 0, $m_b^0$ ← $m_p$
    For i > n
        Estimate keypoints, e.g., $\mathcal{Y}_{key}{}^i = m_k (m_b{}^i (x^{tgt}))$
        Generate pseudo-labels, e.g., $\tilde{\mathcal{Y}}_{key}{}^i = f(\mathcal{Y}_{key}{}^i)$
Update backbone, e.g., compute $m_b{}^{i+1}$ by back-propagating
self-supervised $\mathcal{L}_{key} (\mathcal{Y}_{key}{}^i, \tilde{\mathcal{Y}}_{key}{}^i)$
    Step 2 (test-time): Get TTA masks for test image
        Infer TTA masks, e.g., $\mathcal{Y}_{mask}{}^{TTA} = m_m (m_b{}^{TTA}(x^{tgt}))$

---

Algorithm 1 includes multiple rounds (e.g., 3 rounds) of weight adaptation, each including converting keypoints estimates (denoted as $\mathcal{Y}_{key}{}^i$) to pseudo-labels (denoted as $\tilde{\mathcal{Y}}_{key}{}^i$). The pseudo-labels are then used in determining a keypoint loss (denoted as $\mathcal{L}_{key}$) together with the keypoint estimates. A resulting self-supervised loss is backpropagated to adjust the backbone weights. The systems and techniques can work for any pseudo-label conversion method. In some examples, a pseudo-label conversion method can include, for object (e.g., person, vehicle, etc.) bounding boxes having scores above a threshold score (e.g., a score above 0.5 or other value), keypoints with a minimum probability of 0.05. In some cases, the pseudo-label conversion method can generate pseudo-labels by selecting a location in a heat-map (e.g., 56×56 heat-map) with a highest value. The multi-category cross-entropy loss can be used as the keypoint loss $\mathcal{L}_{key}$. The adapted segmentation masks can then be generated by running a mask head (e.g., a machine learning system, such as a neural network, trained to generate a segmentation mask) on an adapted feature-map.

In some cases, the systems and techniques described herein can perform a training-time regularization approach based on a training-time generalization method. In some examples, the systems and techniques may use an object (e.g., human, vehicle, etc.) instance-segmentation/keypoints-estimation network (e.g., $m=\{m_b, m_m, m_k\}$) that does not need to be trained for the training-time generalization method. In some cases, the network may include a Mask-recurrent convolutional neural network (Mask-RCNN). The systems and techniques may also have access to a labelled source dataset. In some cases, the systems and techniques may not have access to any test images or knowledge about the target domain. In some cases, the systems and techniques may not allow test-time adaptation of network weights. Such features can allow the training-time generalization setup both realistic and challenging. In some examples, illustrative steps of the training-time generalization method are shown in Algorithm 2 below:

---

Algorithm 2: TTG (training-time generalization)

---

Given: Model $m = \{m_b, m_m, m_k\}$, source-dataset $X^{src} = \{(x_i{}^{src}, t_i{}^{src})\}$
Step 1 (training-time): Train generalized model on source dataset
    Split keypoints head into feature-extractor & regressor subnets,
    e.g., $m_k = m_k{}^{reg} \circ m_k{}^{fe}$
    Modify mask head, e.g., $m_m{}^{TTG}$ to accommodate the extra keypoints
    features, e.g., $m_k{}^{fe} \circ m_b(x^{tgt})$
    Train TTG model, e.g., $m^{TTG} = \{m_b, m_m{}^{TTG}, m_k\}$ on $X^{src} =$
    $\{(x_i{}^{src}, t_i{}^{src})\}$
Step 2 (test-time): Get TTA masks for test image $x^{tgt}$
    Infer TTG masks using aggregated features, e.g., $\mathcal{Y}_{mask}{}^{TTG} = m_m{}^{TTG}$
    $(m_b(x^{tgt}), m_k{}^{fe} \circ m_b(x^{tgt}))$

---

As shown in Algorithm 2, the training-time generalization method can include splitting the keypoints head into to sub-nets (e.g., $m_k = m_k{}^{reg} \circ m_k{}^{fe}$) for feature extraction and regression, respectively. The mask head may be modified to accommodate the extra keypoints features. The training-time generalization model $m^{TTG} = \{m_{bb}, m_m{}^{TTG}, m_k\}$ can then be trained on the labeled source dataset using the original loss. At test-time, segmentation masks can be generated by running the training-time generalization mask head on an aggregated feature map.

Various heuristics and keypoint head variants may be used. For instance, performance of the test-time adaptation and training-time generalization methods may depend on the quality of the pseudo-labels and features generated by the keypoints head, respectively. Three keypoints head variants may thus be used, in addition to the Mask-RCNN. Each variant and associated heuristics are described below. In some cases, input to all of the heads can be of dimension N×256×14×14, where N gives the number of object-bounding boxes (e.g., bounding boxes associated with people, vehicles, etc.).

For Mask-RCNN, the feature extraction sub-net $m_k{}^{fe}$ of the keypoints head can include eight two-dimensional (2D)-convolutional layers. In some examples, each 2D-convolutional layer can include 512 output channels, a 3×3 kernel size, and a stride of 1. In such examples, there are 512 extra keypoints features. In some cases, the regression sub-net $m_k{}^{reg}$ can include a 2D-transposed-convolutional layer with 17 (e.g., corresponding to the number of keypoints) output channels, a 4×4 kernel, and a stride of 2, followed by a bi-linear up-sampler to increase the keypoints heatmap resolution to N×17×56×56.

A keypoints head of the mask-RCNN can estimate the keypoint positions. However, it does not predict whether they are visible or occluded, which may hurt the test-time adaptation performance. For example, a position of a person's elbow, which is occluded, may be correctly estimated. However, not knowing that the elbow is occluded may cause parts of an object occluding the elbow to be included in the mask. To address this, variants of mask-RCNN can be used that predict if a keypoint is visible or occluded. A first variant can be identical to Mask-RCNN, except that the 2D-transposed-convolutional layer has 51 outputs to allow two additional outputs per location for visible/occlusion prediction.

In some cases, keypoint estimates from a convolutional head can be of very low quality, severely impacting the test-time adaptation/training-time generalization gains. A second variant of mask-RCNN can use one or more transformers to enhance keypoint estimation through global attention. For example, the feature extraction sub-net $m_k^{fe}$ of the keypoints head can be modified to include a transformer decoder with six layers, eight heads, and 17 queries of width 256, operating on the backbone feature map. The input queries are trainable parameters. Output queries map to keypoints and are decoded through a 3-layer multi-layer perceptron (MLP) (after re-shaping) to a heatmap including N×51×14×14 keypoints. In such an example, there are 51 extra keypoints features. According to the second variant, the regression sub-net $m_k^{reg}$ of the keypoints head can include a bilinear up-sampler to increase the heatmap resolution to 56×56.

A third variant can avoid issues associates with the transformer's output queries being directly decoded to 14×14 heatmaps without using convolutional layers by using the last transformer layer value projections, along with its attention weights to form a 15×14×14 feature map corresponding to each keypoint. In such examples, there are (255=17×15) extra keypoints features. According to the third variant, the regression sub-net $m_k^{reg}$ of the keypoints head can include two group 2D-convolutional and one group 2D-transposed-convolutional layers that further process keypoints feature maps (e.g., independently from one another), followed by a bi-linear up-sampler to obtain the 56×56 heatmaps.

FIG. 7 is a flow diagram illustrating a process 700 for performing online adaptation of one or more machine learning models, in accordance with aspects of the present disclosure. At block 702, the process 700 includes obtaining features extracted from a first image by a machine learning model during inference.

At block 704, the process 700 includes determining, by the machine learning model based on the features during inference, at least one of a plurality of keypoint estimates in the first image or a bounding region estimate associated with an object in the first image. In some aspects, the plurality of keypoint estimates is determined in the first image by a keypoint detection engine of the machine learning model. In some aspects, the bounding region estimate is determined in the first image by an object detection engine of the machine learning model.

In some aspects, the plurality of keypoint estimates include at least one heat map indicating probabilities that portions of the first image correspond to a particular keypoint. In some cases, the at least one heat map includes a plurality of heat maps, each heat map of the plurality of heat maps being associated with a respective keypoint of a plurality of keypoints. In some aspects, the plurality of keypoint estimates include coordinates associated with a plurality of keypoints.

At block 706, the process 700 includes generating one or more pseudo-labels based on at least one of the plurality of keypoint estimates or the bounding region estimate. In some cases, to generate the one or more pseudo-labels, the process 700 may include determining one or more keypoint estimates from the plurality of keypoint estimates that are greater than an individual keypoint score threshold. The process 700 may further include selecting the one or more keypoint estimates as the one or more pseudo-labels based on the one or more keypoint estimates being greater than the individual keypoint score threshold. In some examples, to generate the one or more pseudo-labels, the process 700 may include determining the plurality of keypoint estimates are greater than a total score threshold. The process 700 may further include selecting the plurality of keypoint estimates as the one or more pseudo-labels based on the plurality of keypoint estimates being greater than the total score threshold.

At block 708, the process 700 includes determining at least one self-supervised loss based on at least one of the plurality of keypoint estimates or the bounding region estimate. At block 710, the process 700 includes adapting, based on the at least one self-supervised loss, one or more parameters of the machine learning model. In some cases, the one or more parameters include weights of the machine learning model. In some aspects, the features are extracted from the first image by a feature extraction engine of the machine learning model. In such aspects, to adapt the one or more parameters of the machine learning model based on the at least one self-supervised loss, the process 700 may include adapting one or more parameters of the feature extraction engine.

At block 712, the process 700 includes generating, using the machine learning model with the adapted one or more parameters, a segmentation mask for the first image or a second image (e.g., a next frame from the first image (frame), another frame in a video that includes the first image (frame), other image, etc.). In some aspects, the segmentation mask is generated by a segmentation mask engine of the machine learning model.

In some cases, the process 700 may include processing, using the machine learning model with the adapted one or more parameters, the first image or a second image to generate updated features representing the first image or to generate features representing the second image. In such cases, the segmentation mask may be generated based on processing the updated features representing the first image or the features representing the second image.

In some examples, the processes described herein (e.g., process 700 and/or other process described herein) may be performed by a computing device or apparatus or a component or system (e.g., a chipset, one or more processors (e.g., CPU, GPU, NPU, DSP, etc.), ML system such as a neural network model, etc.) of the computing device or apparatus. The computing device or apparatus may be a vehicle or component or system of a vehicle, a mobile device (e.g., a mobile phone), a network-connected wearable such as a watch, an extended reality (XR) device (e.g., a virtual reality (VR) device, augmented reality (AR) device, and/or mixed reality (MR) device), or other type of computing device. In some cases, the computing device or apparatus can be the SOC 105 of FIG. 1D, the computing system 800 of FIG. 8, the vehicle 100 of FIG. 1A, and/or other computing device or apparatus.

Figure 8:
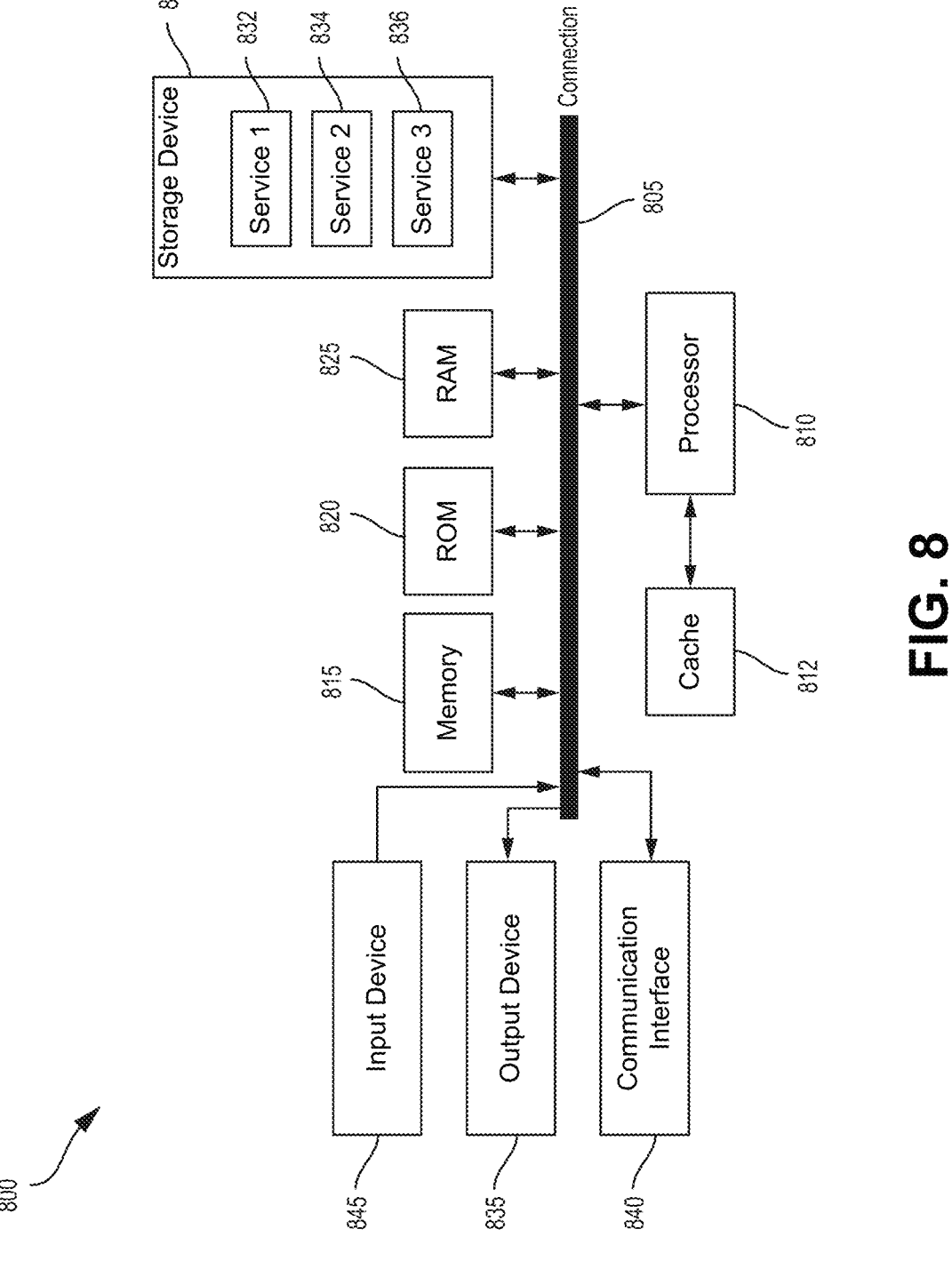
FIG. 8 illustrates an example computing device architecture of an example computing device which can implement the various techniques described herein.

FIG. 8 is a diagram illustrating an example of a system for implementing certain aspects of the present technology, such as the process 700 of FIG. 7. In particular, FIG. 8 illustrates an example of computing system 800, which may be for example any computing device making up internal computing system, a remote computing system, a camera, or any component thereof in which the components of the system are in communication with each other using connection 805. Connection 805 may be a physical connection using a bus, or a direct connection into processor 810, such as in a chipset architecture. Connection 805 may also be a virtual connection, networked connection, or logical connection.

In some aspects, computing system 800 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 may include a cache 812 of high-speed memory connected directly with, in close proximity to, or integrated as part of processor 810.

Processor 810 may include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms. In some instances, multimodal systems may enable a user to provide multiple types of input/output to communicate with computing system 800.

Computing system 800 may include communications interface 840, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ ™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 may include software services, servers, services, etc., that when the code that defines such software is executed by the processor 810, it causes the system to perform a function. In some aspects, a hardware service that performs a particular function may include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B"

means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A processor-implemented method, comprising: obtaining features extracted from a first image by a machine learning model during inference; determining, by the machine learning model based on the features during inference, at least one of a plurality of keypoint estimates in the first image or a bounding region estimate associated with an object in the first image; generating one or more pseudo-labels based on at least one of the plurality of keypoint estimates or the bounding region estimate; determining at least one self-supervised loss based on at least one of the plurality of keypoint estimates or the bounding region estimate; adapting, based on the at least one self-supervised loss, one or more parameters of the machine learning model; and generating, using the machine learning model with the adapted one or more parameters, a segmentation mask for the first image or a second image.

Aspect 2. The method of claim 1, further comprising: processing, using the machine learning model with the adapted one or more parameters, the first image or a second image to generate updated features representing the first image or to generate features representing the second image.

Aspect 3. The method of claim 2, wherein the segmentation mask is generated based on processing the updated features representing the first image or the features representing the second image.

Aspect 4. The method of any one of claims 1 to 3, wherein the plurality of keypoint estimates are determined in the first image by a keypoint detection engine of the machine learning model.

Aspect 5. The method of any one of claims 1 to 4, wherein the bounding region estimate is determined in the first image by an object detection engine of the machine learning model.

Aspect 6. The method of any one of claims 1 to 5, wherein the features are extracted from the first image by a feature extraction engine of the machine learning model, and wherein adapting, based on the at least one self-supervised loss, the one or more parameters of the machine learning model comprises: adapting one or more parameters of the feature extraction engine.

Aspect 7. The method of any one of claims 1 to 6, wherein the segmentation mask is generated by a segmentation mask engine of the machine learning model.

Aspect 8. The method of any one of claims 1 to 7, wherein the plurality of keypoint estimates include at least one heat map indicating probabilities that portions of the first image correspond to a particular keypoint.

Aspect 9. The method of claim 8, wherein the at least one heat map includes a plurality of heat maps, each heat map of the plurality of heat maps being associated with a respective keypoint of a plurality of keypoints.

Aspect 10. The method of any one of claims 1 to 7, wherein the plurality of keypoint estimates include coordinates associated with a plurality of keypoints.

Aspect 11. The method of any one of claims 1 to 10, wherein generating the one or more pseudo-labels comprises: determining one or more keypoint estimates from the plurality of keypoint estimates that are greater than an individual keypoint score threshold; and selecting the one or more keypoint estimates as the one or more pseudo-labels based on the one or more keypoint estimates being greater than the individual keypoint score threshold.

Aspect 12. The method of any one of claims 1 to 10, wherein generating the one or more pseudo-labels comprises: determining the plurality of keypoint estimates are greater than a total score threshold; and selecting the plurality of keypoint estimates as the one or more pseudo-labels based on the plurality of keypoint estimates being greater than the total score threshold.

Aspect 13. The method of any one of claims 1 to 12, wherein the one or more parameters include weights of the machine learning model.

Aspect 14. An apparatus for performing online adaptation of one or more machine learning models, comprising: at least one memory; and at least one processor coupled to the at least one memory and configured to: obtain features extracted from a first image by a machine learning model during inference; determine, using the machine learning model based on the features during inference, at least one of a plurality of keypoint estimates in the first image or a bounding region estimate associated with an object in the first image; generate one or more pseudo-labels based on at least one of the plurality of keypoint estimates or the bounding region estimate; determine at least one self-supervised loss based on at least one of the plurality of keypoint estimates or the bounding region estimate; adapt, based on the at least one self-supervised loss, one or more parameters of the machine learning model; and generate, using the machine learning model with the adapted one or more parameters, a segmentation mask for the first image or a second image.

Aspect 15. The apparatus of claim 14, wherein the at least one processor is configured to: process, using the machine learning model with the adapted one or more parameters, the first image or a second image to generate updated features representing the first image or to generate features representing the second image.

Aspect 16. The apparatus of claim 15, wherein the at least one processor is configured to generate the segmentation mask based on processing the updated features representing the first image or the features representing the second image.

Aspect 17. The apparatus of any one of claims 14 to 16, wherein the at least one processor is configured to determine the plurality of keypoint estimates in the first image using a keypoint detection engine of the machine learning model.

Aspect 18. The apparatus of any one of claims 14 to 17, wherein the at least one processor is configured to determine the bounding region estimate in the first image using an object detection engine of the machine learning model.

Aspect 19. The apparatus of any one of claims 14 to 18, wherein the at least one processor is configured to extract the features from the first image using a feature extraction engine of the machine learning model, and wherein, to adapt the one or more parameters of the machine learning model based on the at least one self-supervised loss, the at least one processor is configured to: adapt one or more parameters of the feature extraction engine.

Aspect 20. The apparatus of any one of claims 14 to 19, wherein the at least one processor is configured to generate the segmentation mask using a segmentation mask engine of the machine learning model.

Aspect 21. The apparatus of any one of claims 14 to 20, wherein the plurality of keypoint estimates include at least one heat map indicating probabilities that portions of the first image correspond to a particular keypoint.

Aspect 22. The apparatus of claim 21, wherein the at least one heat map includes a plurality of heat maps, each heat map of the plurality of heat maps being associated with a respective keypoint of a plurality of keypoints.

Aspect 23. The apparatus of any one of claims 14 to 20, wherein the plurality of keypoint estimates include coordinates associated with a plurality of keypoints.

Aspect 24. The apparatus of any one of claims 14 to 23, wherein, to generate the one or more pseudo-labels, the at least one processor is configured to: determine one or more keypoint estimates from the plurality of keypoint estimates that are greater than an individual keypoint score threshold; and select the one or more keypoint estimates as the one or more pseudo-labels based on the one or more keypoint estimates being greater than the individual keypoint score threshold.

Aspect 25. The apparatus of any one of claims 14 to 23, wherein, to generate the one or more pseudo-labels, the at least one processor is configured to: determine the plurality of keypoint estimates are greater than a total score threshold; and select the plurality of keypoint estimates as the one or more pseudo-labels based on the plurality of keypoint estimates being greater than the total score threshold.

Aspect 26. The apparatus of any one of claims 14 to 25, wherein the one or more parameters include weights of the machine learning model.

Aspect 27. A non-transitory computer-readable medium for performing online adaptation of one or more machine learning models, the computer-readable medium having stored thereon instructions that, when executed by at least one processor, cause the at least one processor to perform operations according to any of claims 1 to 13.

Aspect 28. An apparatus for performing online adaptation of one or more machine learning models, the apparatus comprising one or more means for performing operations according to any of claims 1 to 13.

What is claimed is:

1. A processor-implemented method, comprising:

obtaining features extracted from a first image by a machine learning model during inference;

determining, by the machine learning model based on the features during inference, at least one of a plurality of keypoint estimates in the first image or a bounding region estimate associated with an object in the first image;

generating one or more pseudo-labels based on at least one of the plurality of keypoint estimates or the bounding region estimate;

determining at least one self-supervised loss based on at least one of the plurality of keypoint estimates or the bounding region estimate;

adapting, based on the at least one self-supervised loss, one or more parameters of the machine learning model; and generating, using the machine learning model with the adapted one or more parameters, a segmentation mask for the first image or a second image;

wherein the features are extracted from the first image by a feature extraction engine of the machine learning model; and wherein adapting, based on the at least one self-supervised loss, the one or more parameters of the machine learning model comprises adapting one or more parameters of the feature extraction engine.

2. The method of claim 1, further comprising:

processing, using the machine learning model with the adapted one or more parameters, the first image or a second image to generate updated features representing the first image or to generate features representing the second image.

3. The method of claim 2, wherein the segmentation mask is generated based on processing the updated features representing the first image or the features representing the second image.

4. The method of claim 1, wherein the plurality of keypoint estimates is determined in the first image by a keypoint detection engine of the machine learning model.

5. The method of claim 1, wherein the bounding region estimate is determined in the first image by an object detection engine of the machine learning model.

6. The method of claim 1, wherein the segmentation mask is generated by a segmentation mask engine of the machine learning model.

7. The method of claim 1, wherein the plurality of keypoint estimates includes at least one heat map indicating probabilities that portions of the first image correspond to a particular keypoint.

8. The method of claim 7, wherein the at least one heat map includes a plurality of heat maps, each heat map of the plurality of heat maps being associated with a respective keypoint of a plurality of keypoints.

9. The method of claim 1, wherein the plurality of keypoint estimates include coordinates associated with a plurality of keypoints.

10. The method of claim 1, wherein generating the one or more pseudo-labels comprises:

determining one or more keypoint estimates from the plurality of keypoint estimates that are greater than an individual keypoint score threshold; and selecting the one or more keypoint estimates as the one or more pseudo-labels based on the one or more keypoint estimates being greater than the individual keypoint score threshold.

11. The method of claim 1, wherein generating the one or more pseudo-labels comprises:

determining the plurality of keypoint estimates are greater than a total score threshold; and selecting the plurality of keypoint estimates as the one or more pseudo-labels based on the plurality of keypoint estimates being greater than the total score threshold.

12. The method of claim 1, wherein the one or more parameters include weights of the machine learning model.

13. An apparatus for performing online adaptation of one or more machine learning models, the apparatus comprising:

at least one memory; and at least one processor coupled to the at least one memory and configured to:

obtain features extracted from a first image by a machine learning model during inference;

determine, using the machine learning model based on the features during inference, at least one of a plurality of keypoint estimates in the first image or a bounding region estimate associated with an object in the first image;

generate one or more pseudo-labels based on at least one of the plurality of keypoint estimates or the bounding region estimate;

determine at least one self-supervised loss based on at least one of the plurality of keypoint estimates or the bounding region estimate;

adapt, based on the at least one self-supervised loss, one or more parameters of the machine learning model; and generate, using the machine learning model with the adapted one or more parameters, a segmentation mask for the first image or a second image;

wherein the features are extracted from the first image by a feature extraction engine of the machine learning model; and wherein adapting, based on the at least one self-supervised loss, the one or more parameters of the machine learning model comprises adapting one or more parameters of the feature extraction engine.

14. The apparatus of claim 13, wherein the at least one processor is configured to:

process, using the machine learning model with the adapted one or more parameters, the first image or a second image to generate updated features representing the first image or to generate features representing the second image.

15. The apparatus of claim 14, wherein the at least one processor is configured to generate the segmentation mask based on processing the updated features representing the first image or the features representing the second image.

16. The apparatus of claim 13, wherein the at least one processor is configured to determine the plurality of keypoint estimates in the first image using a keypoint detection engine of the machine learning model.

17. The apparatus of claim 13, wherein the at least one processor is configured to determine the bounding region estimate in the first image using an object detection engine of the machine learning model.

18. The apparatus of claim 13, wherein the at least one processor is configured to generate the segmentation mask using a segmentation mask engine of the machine learning model.

19. The apparatus of claim 13, wherein the plurality of keypoint estimates includes at least one heat map indicating probabilities that portions of the first image correspond to a particular keypoint.

20. The apparatus of claim 19, wherein the at least one heat map includes a plurality of heat maps, each heat map of the plurality of heat maps being associated with a respective keypoint of a plurality of keypoints.

21. The apparatus of claim 13, wherein the plurality of keypoint estimates includes coordinates associated with a plurality of keypoints.

22. The apparatus of claim 13, wherein, to generate the one or more pseudo-labels, the at least one processor is configured to:

determine one or more keypoint estimates from the plurality of keypoint estimates that are greater than an individual keypoint score threshold; and select the one or more keypoint estimates as the one or more pseudo-labels based on the one or more keypoint estimates being greater than the individual keypoint score threshold.

23. The apparatus of claim 13, wherein, to generate the one or more pseudo-labels, the at least one processor is configured to:

determine the plurality of keypoint estimates are greater than a total score threshold; and select the plurality of keypoint estimates as the one or more pseudo-labels based on the plurality of keypoint estimates being greater than the total score threshold.

24. The apparatus of claim 13, wherein the one or more parameters include weights of the machine learning model.

25. A non-transitory computer-readable medium having stored thereon instructions that, when executed by at least one processor, cause the at least one processor to:

obtain features extracted from a first image by a machine learning model during inference;

determine, using the machine learning model based on the features during inference, at least one of a plurality of keypoint estimates in the first image or a bounding region estimate associated with an object in the first image;

generate one or more pseudo-labels based on at least one of the plurality of keypoint estimates or the bounding region estimate;

determine at least one self-supervised loss based on at least one of the plurality of keypoint estimates or the bounding region estimate;

adapt, based on the at least one self-supervised loss, one or more parameters of the machine learning model; and generate, using the machine learning model with the adapted one or more parameters, a segmentation mask for the first image or a second image;

wherein the features are extracted from the first image by a feature extraction engine of the machine learning model; and wherein adapting, based on the at least one self-supervised loss, the one or more parameters of the machine learning model comprises adapting one or more parameters of the feature extraction engine.

26. An apparatus for performing online adaptation of one or more machine learning models, the apparatus comprising:

means for obtaining features extracted from a first image by a machine learning model during inference;

means for determining, by the machine learning model based on the features during inference, at least one of a plurality of keypoint estimates in the first image or a bounding region estimate associated with an object in the first image;

means for generating one or more pseudo-labels based on at least one of the plurality of keypoint estimates or the bounding region estimate;

means for determining at least one self-supervised loss based on at least one of the plurality of keypoint estimates or the bounding region estimate;

means for adapting, based on the at least one self-supervised loss, one or more parameters of the machine learning model; and means for generating, using the machine learning model with the adapted one or more parameters, a segmentation mask for the first image or a second image;

wherein the features are extracted from the first image by a feature extraction engine of the machine learning model; and wherein adapting, based on the at least one self-supervised loss, the one or more parameters of the machine learning model comprises adapting one or more parameters of the feature extraction engine.

* * * * *